(12) United States Patent
Gheith et al.

(10) Patent No.: US 9,158,701 B2
(45) Date of Patent: Oct. 13, 2015

(54) PROCESS-SPECIFIC VIEWS OF LARGE FRAME PAGES WITH VARIABLE GRANULARITY

(75) Inventors: Ahmed Gheith, Austin, TX (US); Eric Van Hensbergen, Austin, TX (US); James Xenidis, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 391 days.

(21) Appl. No.: 13/541,055

(22) Filed: Jul. 3, 2012

(65) Prior Publication Data

US 2014/0013073 A1    Jan. 9, 2014

(51) Int. Cl.
G06F 12/00    (2006.01)
G06F 12/10    (2006.01)

(52) U.S. Cl.
CPC .......... *G06F 12/1009* (2013.01); *G06F 12/109* (2013.01)

(58) Field of Classification Search
CPC .............. G06F 12/109; G06F 12/1009; G06F 2212/656
See application file for complete search history.

(56) References Cited

U.S. PATENT DOCUMENTS

| | | | |
|---|---|---|---|
| 5,454,091 A | 9/1995 | Sites et al. | |
| 6,012,132 A * | 1/2000 | Yamada et al. | 711/207 |
| 6,167,509 A | 12/2000 | Sites et al. | |
| 7,356,667 B2 | 4/2008 | Harris et al. | |
| 7,721,064 B1 * | 5/2010 | Lam et al. | 711/170 |
| 7,984,304 B1 | 7/2011 | Waldspurger et al. | |
| 2010/0299667 A1 * | 11/2010 | Ahmad et al. | 718/1 |
| 2011/0138476 A1 | 6/2011 | Black et al. | |

OTHER PUBLICATIONS

Anonymous; Stack segment page-in/page-out optimization by VMM, May 19, 2010.
Brown et al., Recursive Technique for Validating Virtual Storage When Page Tables are Pageable, Jan. 29, 2005.
Chang et al., Hashed Page Table for Virtual Address Translation, Mar. 30, 2005.

* cited by examiner

*Primary Examiner* — Aimee Li
*Assistant Examiner* — Hannah A Faye-Joyner
(74) *Attorney, Agent, or Firm* — Garg Law Firm, PLLC; Rakesh Garg; William J. Stock

(57) ABSTRACT

The page tables in existing art are modified to allow virtual address resolution by mapping to multiple overlapping entries, and resolving a physical address from the most specific entry. This enables more efficient use of system resources by allowing smaller frames to shadow larger frames. A page table is selected. When a virtual address in a request corresponds to an entry in the page table, which identifies a next page table associated with the large frame, a determination is made that the virtual address corresponds to an entry in the next page table, the entry in the next page table referencing a small frame overlay for the large frame. The virtual address is mapped to a physical address in the small frame overlay using data of the entry in the next page table. The physical address in a process-specific view of the large frame is returned.

20 Claims, 10 Drawing Sheets

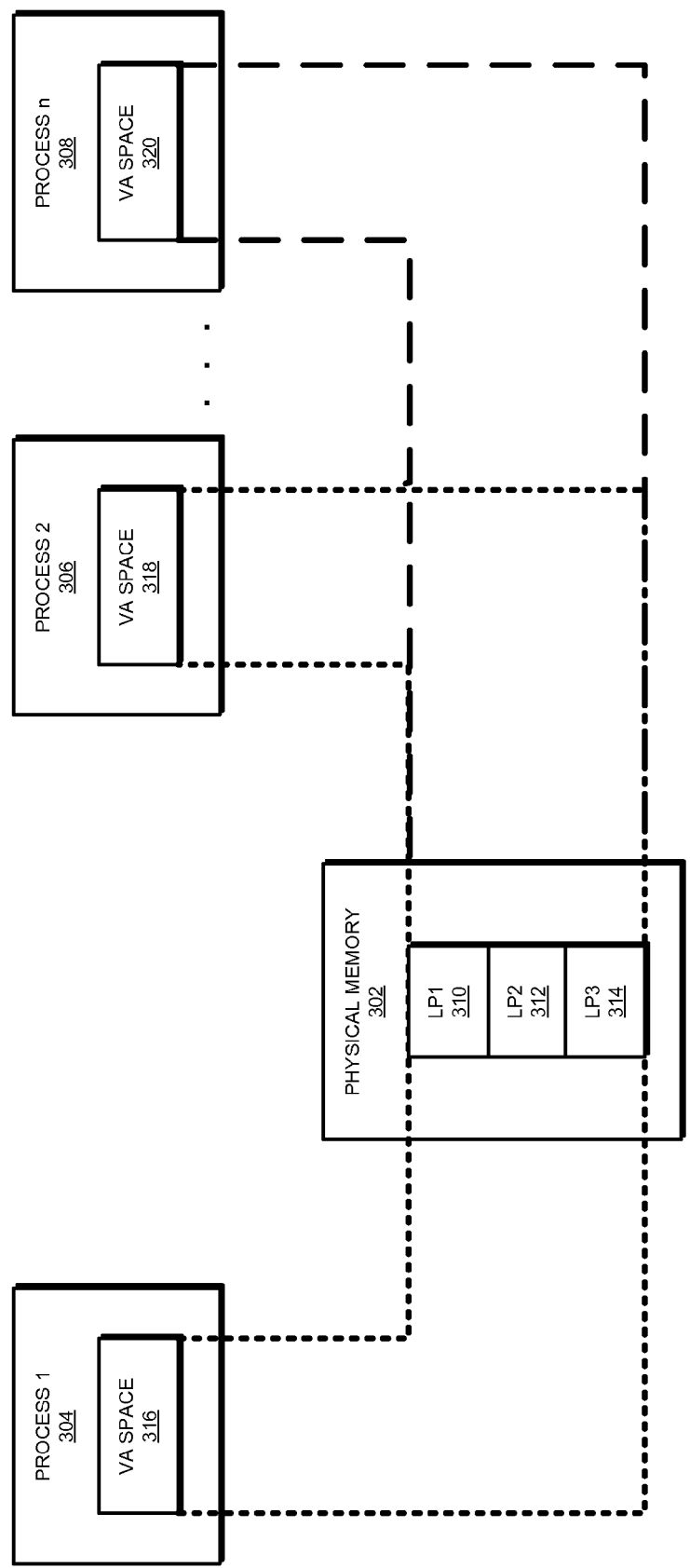

PROCESS-SPECIFIC VIEWS OF LARGE FRAME PAGES WITH VARIABLE GRANULARITY

TECHNICAL FIELD

The present invention relates generally to a method, system, and computer program product for accessing memory in a data processing system. Particularly, the present invention relates to a method, system, and computer program product for using large frame memory pages with variable granularity.

BACKGROUND

Data processing systems include memory devices for storing, processing, and moving data. A memory device, or memory, is generally a physical component of a data processing system configured to store data. Physical memory in a data processing system can include any number of memory devices operating together as the memory available to processes executing in the data processing system.

Physical memory is addressed using physical addresses that point at locations in the physical memory. The physical addresses belong to a physical address space configured in the data processing system. A virtual address is an address that has to be mapped to a physical address to access the data stored in the location corresponding to the physical address.

A process executing in the data processing system does not reference the physical memory using physical addresses. The process can only use virtual addresses from a virtual address space that is specified and configured for use by the process. Other processes similarly use virtual addresses from other virtual address spaces to access physical memory.

The virtual address to physical address mapping allows an operating system, or a memory management subsystem thereof, to offer more memory in virtual form to the processes that execute in the data processing system than is physically available in the data processing system. Furthermore, the virtual address to physical address mapping allows an operating system, or a memory management subsystem thereof, to share some memory space amongst processes where the processes share common data, and keep the processes' individual data separate from other processes.

A page frame, or a frame, is a fixed size chunk of physical memory that is mapped by a single translation entry in the memory management subsystem. When a process changes even a bit in a frame, the entire frame is deemed to have changed. When a process requests even a bit of data within a frame, the entire frame has to be resident in memory. If the frame of the requested data is not resident in memory, the memory management subsystem brings the entire frame into memory from a secondary data storage unit, such as a hard disk drive, via a mechanism called a page fault.

A commonly used frame size is 4 kilobytes (KB), which was established in the early days of computers, when physical memory available in computers was of the order of KB or megabytes (MB)—significantly smaller than physical memories being configured in presently available computing systems. For example, presently, data processing systems having gigabytes (GB) of physical memory are commonplace, and systems with terabytes (TB) of physical memory are not uncommon. Modern operating systems allow addressing using addresses that are 64 bits long, allowing for page frames that can be as large as the addressability of the system.

SUMMARY

The illustrative embodiments provide a method, system, and computer program product for using large frame pages with variable granularity. In at least one embodiment, a method for using a large frame is provided. The method includes selecting a page table, wherein the page table references data stored in a physical memory associated with a data processing system. The method further includes determining, using a processor in a data processing system, whether a virtual address in a request corresponds to an entry in the page table. The method further includes determining, responsive to the virtual address corresponding to the entry in the page table, chat the entry in the page table identifies a next page cable associated with the large frame, wherein the large frame is a page of the data in the memory such that the a size of the page exceeds a threshold size. The method further includes determining that the virtual address corresponds to an entry in the next level of the page table, the entry in the next page table referencing a smaller frame overlay for the large frame, wherein the smaller frame is a second page of data in the memory such the size of the second page does not exceed the threshold size. The method further includes mapping the virtual address to a physical address in the small frame overlay using data of the entry in the next level of the page table. The method further includes returning, responsive to the request, the physical address in a process-specific view of the large frame.

BRIEF DESCRIPTION OF THE SEVERAL VIEWS OF THE DRAWINGS

The novel features believed characteristic of the invention are set forth in the appended claims. The invention itself, however, including a preferred mode of use, further objectives and advantages thereof, will best be understood by reference to the following detailed description of illustrative embodiments when read in conjunction with the accompanying drawings, wherein:

FIG. 3A depicts a block diagram of a configuration of an example copy-on-write operation using large frame pages that can be improved using an illustrative embodiment;

DETAILED DESCRIPTION

Figure 1:
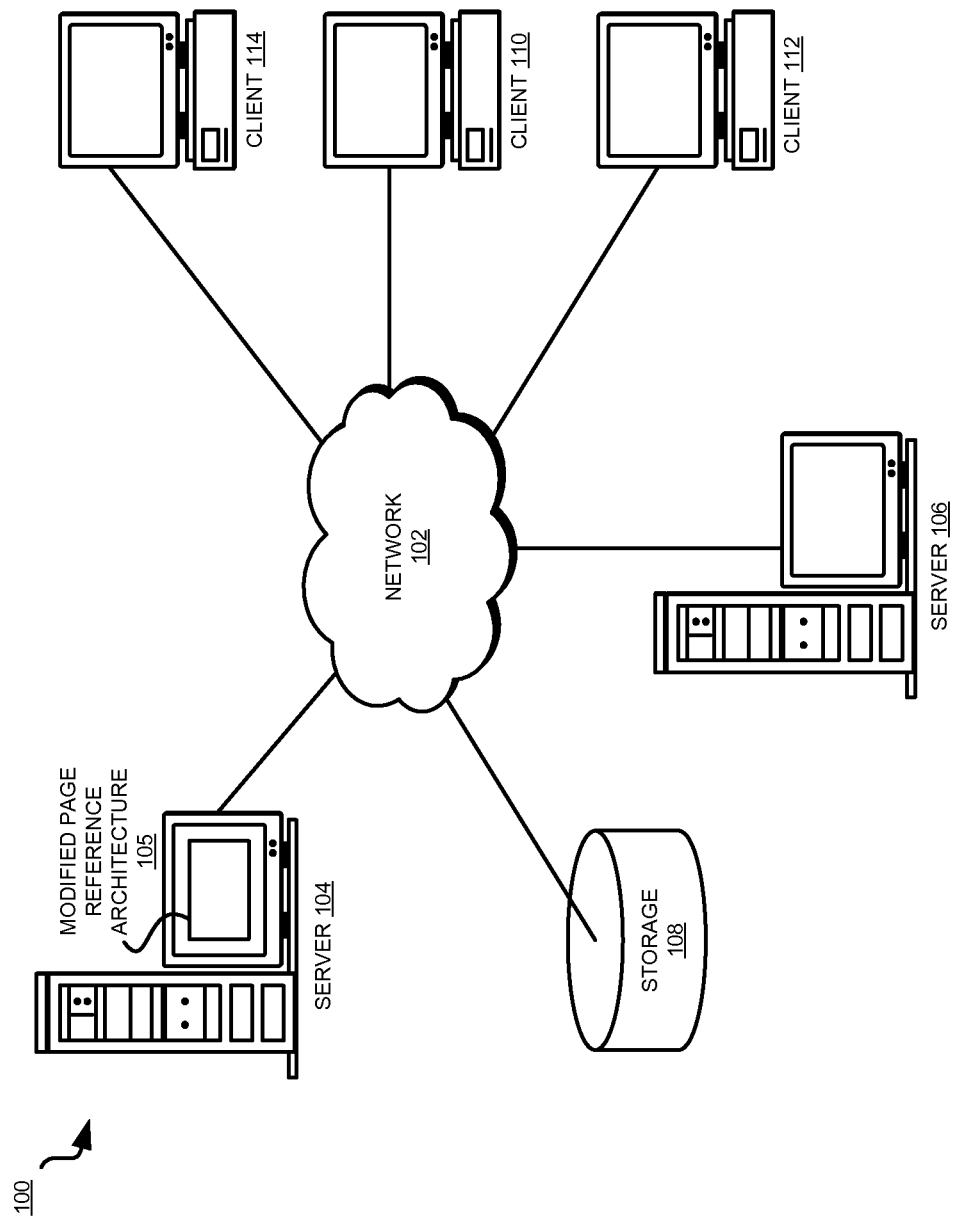
FIG. 1 depicts a pictorial representation of a network of data processing systems in which illustrative embodiments may be implemented.

Frames of up to a threshold size, such as 4 KB, are called small frames. Frames of size larger than the threshold size, such as larger than 4 KB, are called large frames. For example, some presently available data processing systems allow frames of 16 MB, which are 4096 times larger than the 4 KB small frames. In such an example case, 4 KB can be regarded as the threshold size, 4 KB frames are accordingly regarded as small frames, and 16 MB frames are regarded as large frames. The example sizes of 4 KB and 16 MB are used in the description only as examples. The illustrative embodiments impose no restriction on the selection of the threshold size for delineating small frames and large frames.

Copy-on-write (COW) is an operation that optimizes when a frame is shared between processes and when that frame has to be copied for individual use by a process. Generally, COW works as follows—assume that two or more processes share some data that is stored in a frame. A memory management subsystem maintains one copy of the frame in physical memory, accessible using one physical address. Each process accesses that frame using different virtual addresses from their respective virtual address spaces. The different virtual addresses are mapped to the same physical address for the frame, thereby allowing the processes access to the shared data of the frame, so long as neither process attempts to change any part of that frame.

When one of the processes changes any part of the shared frame, the memory management subsystem creates a copy of the frame in a different physical location, addressable using a different physical address, and applies the changes to the copy. The virtual address used by the process that changed the frame is remapped to the new physical address or the changed copy of the frame. The other process(es) that did not cause the change continue to access the frame's original data in the frame's original location using virtual address translations that continue to map their respective virtual addresses to the original physical address. Virtual addresses pointing within a frame are mapped or remapped to corresponding physical addresses in the original frame or the changed copy of the frame in a similar manner.

The illustrative embodiments recognize that certain operations, such as COW described above, are presently limited to copying the entire frame when a need to make a copy arises. The illustrative embodiments recognize that large frame configuration of a system's memory makes operations such as COW expensive in terms of memory space used and copy overhead. For example, in a small frame configuration, COW operation copies only 4 KB of data. However, presently available large frame configurations, such as a 16 MB large frame configuration, would force a COW operation to copy 16 MB of data, using up 16 MB of physical memory space, and using significantly more processor cycles to copy 4096 times more data than a small frame configuration.

The illustrative embodiments recognize that while large frame configurations are preferable over small frame configurations given the size of physical memory and address spaces being configured in modern data processing systems, the desirability of large frame configurations is adversely affected by such granularity-related drawbacks. In other words, certain operations dealing with changes to a large frame presently require the entire frame to be copied or modified, not smaller portions—smaller granules or fine-granularity—of the large frame. Therefore, a method and system by which large frame configurations could be used without such granularity-related limitations would be desirable.

The illustrative embodiments used to describe the invention generally address and solve the above-described problems and other problems related to using large frames memory pages. The illustrative embodiments provide a method, system, and computer program product for using large frame pages with variable granularity.

Using COW as an example operation, generally, an embodiment allows less than a full large frame to be copied on write. For example, an embodiment allows the processes to continue using large frames but overlays the changed portions of the large frame with changed data of the small frame size or another selected smaller granularity. An embodiment provides a mechanism to maintain common data in the common large frame, applying process-specific changes to frames of smaller-than-whole-granularity size as overlays. If a process requests data from the unchanged portion of the large frame, an embodiment returns a mapping of the virtual address in the request to a physical address within the unchanged original large frame. If the process requests data from the changed portion of the large frame, an embodiment returns a mapping of the virtual address in the request to a physical address within the small frame overlay that contained the changed data.

The illustrative embodiments are described with respect to certain designs, sizes, and operations only as examples. Such descriptions are not intended to be limiting on the invention. For example, while a 16 MB frame is used as an example large frame in the illustrative embodiments, any frame size of larger than a threshold size can be manipulated using an embodiment within the scope of the illustrative embodiments. As another example, while 4 KB small frames are used as overlay frames in the description of certain embodiments, an implementation can use any size of overlay frame, up to a predetermined threshold size, without departing the scope of the illustrative embodiments. Furthermore, those of ordinary skill in the art will be able to adapt an embodiment to use overlay frames of different sizes simultaneously, and such adaptations are contemplated within the scope of the illustrative embodiments. Additionally, COW is used only as an example operation for the clarity of the description, and not to imply a limitation on the illustrative embodiments thereto. Many other operations that require differing views of parts of a large frame of data will be able to use an embodiment to improve large frame usage efficiencies in a similar manner, and such operations are also contemplated within the scope of the illustrative embodiments.

Furthermore, the illustrative embodiments may be implemented with respect to any type of data, data source, or access to a data source over a data network. Any type of data application or storage device may provide the data, such as data for deploying or configuring an application, to an embodiment of the invention, either locally at a data processing system or over a data network, within the scope of the invention.

An embodiment of the invention may be implemented with respect to any type of application, such as, for example, applications that are served, the instances of any type of server application, a platform application, a stand-alone application, an administration application, or a combination thereof. An application, including an application implementing all or part of an embodiment, may further include data objects, code objects, encapsulated instructions, application fragments, services, and other types of resources available in a data processing environment. For example, a Java object, an Enterprise Java Bean (EJB), a servlet, or an applet may be manifestations of an application with respect to which the invention may be implemented (Java and all Java-based trademarks and logos are trademarks or registered trademarks of Oracle and/or its affiliates).

An illustrative embodiment may be implemented in hardware, software, or a combination thereof. An illustrative embodiment may further be implemented with respect to any type of data storage resource, such as a physical or virtual data storage device, that may be available in a given data processing system configuration.

The examples in this disclosure are used only for the clarity of the description and are not limiting on the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting on the illustrative embodiments. Additional or different advantages may be realized by specific illustrative embodiments. Furthermore, a particular illustrative embodiment may have some, all, or none of the advantages listed above.

Figure 2:
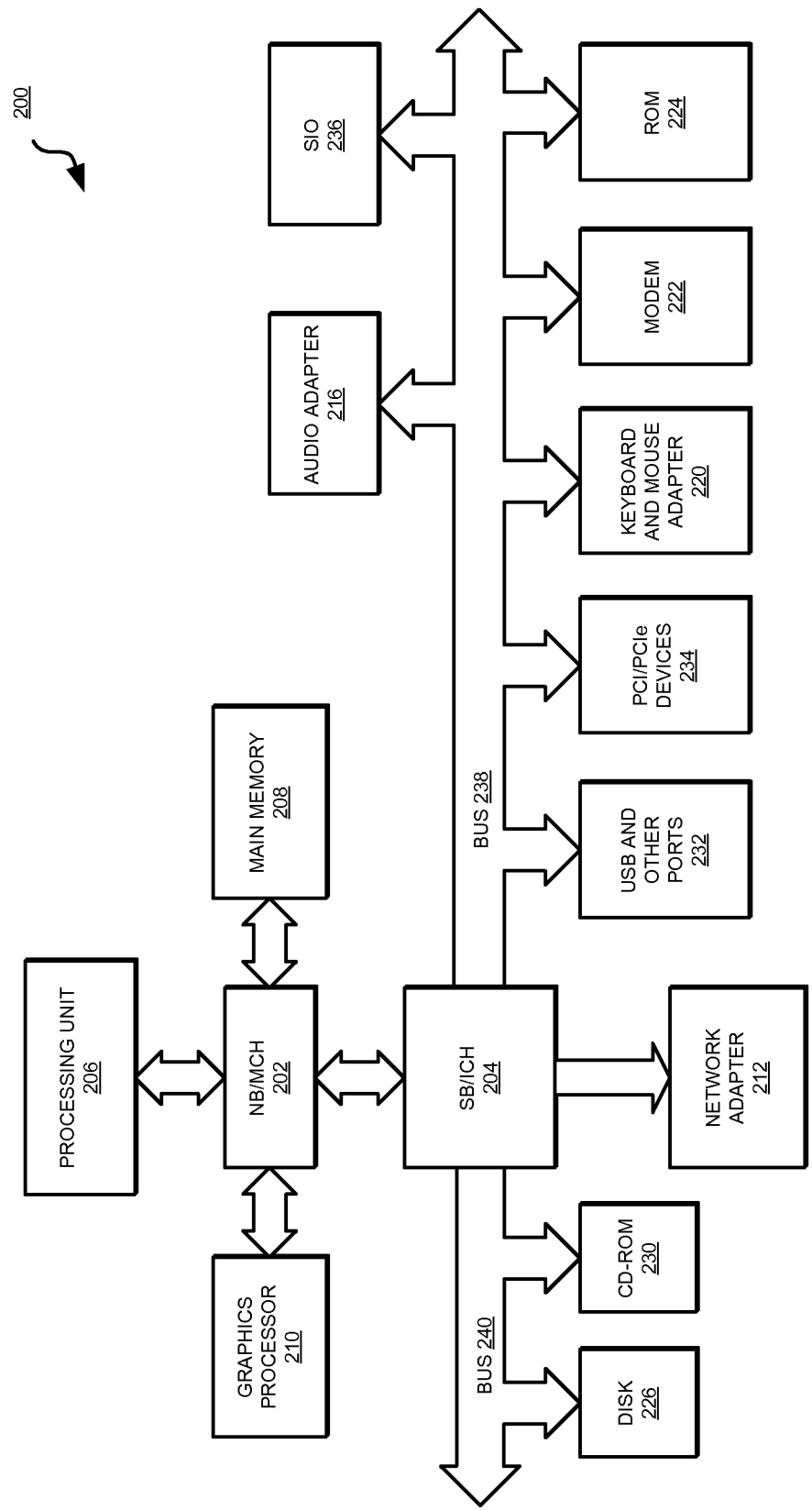
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Only as an example, and without implying any limitation to such architecture, FIG. 1 depicts certain components that are typically used for memory management in data processing systems. For example, server 104 may include modified page reference architecture 105. Modified page reference architecture 105 is a combination of an embodiment and an existing page reference architecture, which may include one or more page tables, page addressing schemes, address space state data registers (ASD), or a combination of these or other similarly purposed architectural constructs or components for address translations and memory page access.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, or another type of device in which computer usable program code or instructions implementing the processes may be located for the illustrative embodiments.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive 226, CD-ROM 230, and other similarly usable devices are some examples of computer usable storage devices including computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as modified page reference architecture 105 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

With reference to FIG. 3A, this figure depicts a block diagram of a configuration of an example copy-on-write operation using large frame pages that can be improved using an illustrative embodiment. Physical memory 302 can be implemented using main memory 208 in FIG. 2. An efficiency of the depicted example COW operation in the depicted configuration can be improved my managing physical memory 302 using modified page reference architecture 105 in FIG. 1.

Processes 304 labeled "Process 1", 306 labeled "Process 2", and 308 labeled "Process n" represent any number of example processes sharing data in physical memory 302. Assume that each of pages 310, 312, and 314, labeled "LP1", "LP2", and "LP3" respectively, include data that is shared by processes 304, 306, and 308. Furthermore, each of pages 310, 312, and 314 is a page that uses a large frame size, such as, including but not limited to, an example 16 MB large frame size.

Process 304 accesses contents of large frame pages 310-312 using virtual addresses from virtual address space 316. Similarly, process 306 accesses contents of large frame pages 310-312 using virtual addresses from virtual address space 318. Process 308 accesses contents of large frame pages 310-312 using virtual addresses from virtual address space 320. Virtual addresses from virtual address spaces 316, 318, and 320 are distinct from one another, but map to common physical addresses for large frame pages 310-314 in physical memory 302. For example, an existing page reference architecture, or modified page reference architecture 105 in FIG. 1, can translate a virtual address in virtual address space 316 to a physical address within large frame page 310. The existing page reference architecture, or modified page reference architecture 105 in FIG. 1, can translate other virtual addresses from any process corresponding physical addresses within any large frame page in a similar manner.

Figure 3B:
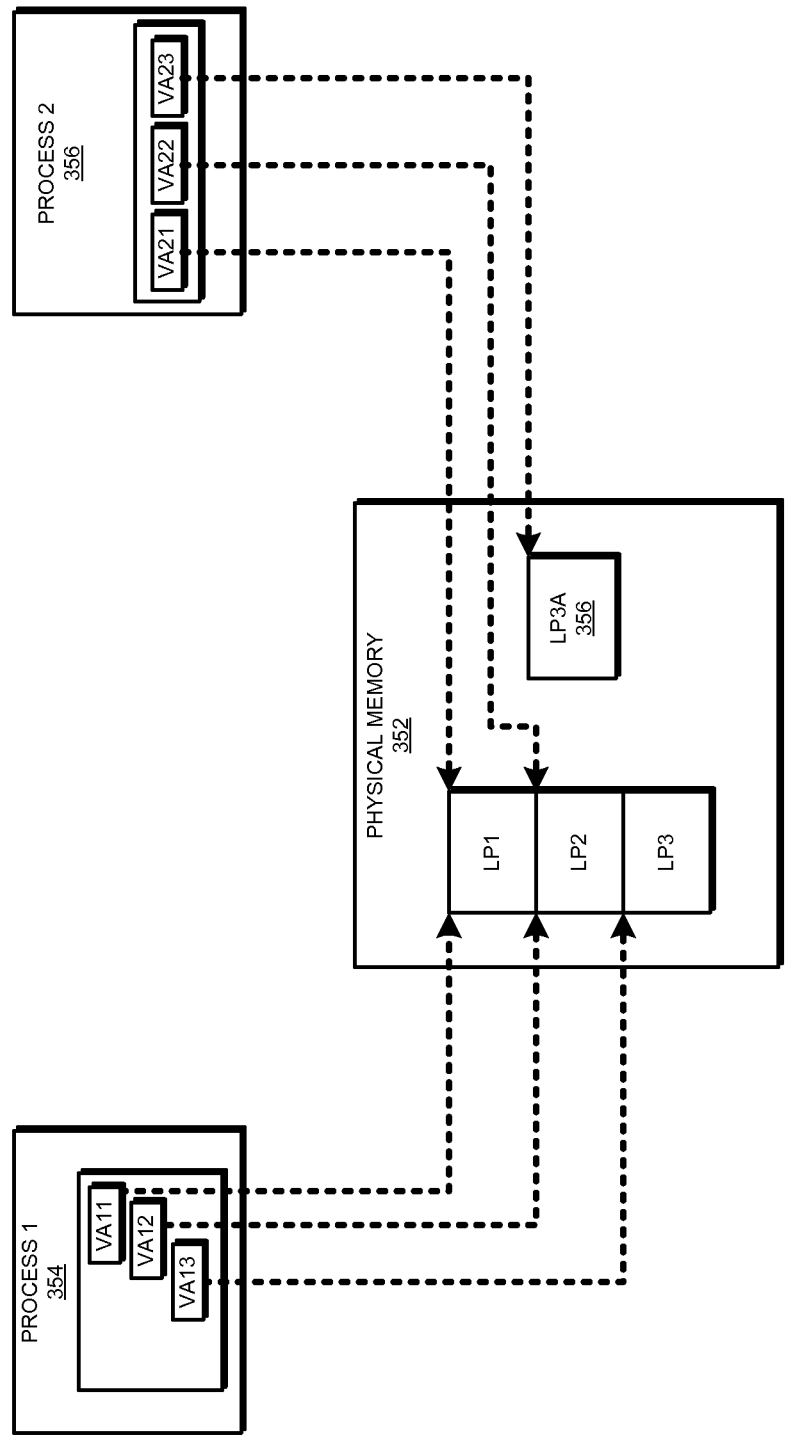
FIG. 3B depicts a block diagram of the result of an example copy-on-write operation using large frame pages that can be improved using an illustrative embodiment.

With reference to FIG. 3B, this figure depicts a block diagram of the result of an example copy-on-write operation using large frame pages that can be improved using an illustrative embodiment. Physical memory 352 is indicative of a post-COW operation state of memory 302 in FIG. 3A. Processes 354 and 356 are the same as processes 304 and 306 in FIG. 3A.

VA11, VA12, and VA13 are virtual addresses in process 354's virtual address space (virtual address space 316 in FIG. 3A). VA11, VA12, and VA13 translate to physical addresses in original large frame pages 310, 312, and 314, labeled LP1, LP2, and LP3, respectively in FIG. 3A. VA21, VA22, and VA23 are virtual addresses in process 354's virtual address space (virtual address space 318 in FIG. 3A). Before the example COW operation of FIG. 3B, VA21, VA22, and VA23 translate to physical addresses in original large frame pages 310, 312, and 314, labeled LP1, LP2, and LP3, respectively in FIG. 3A.

Assume that process 354 has changed a byte of data in LP3. Disadvantageously, a prior art page reference architecture creates a copy of the entire LP3 frame as large frame page 356, labeled "LP3A" for process 354 and remaps VA23 to now translate to physical address in copied large frame page 356.

Figure 4:
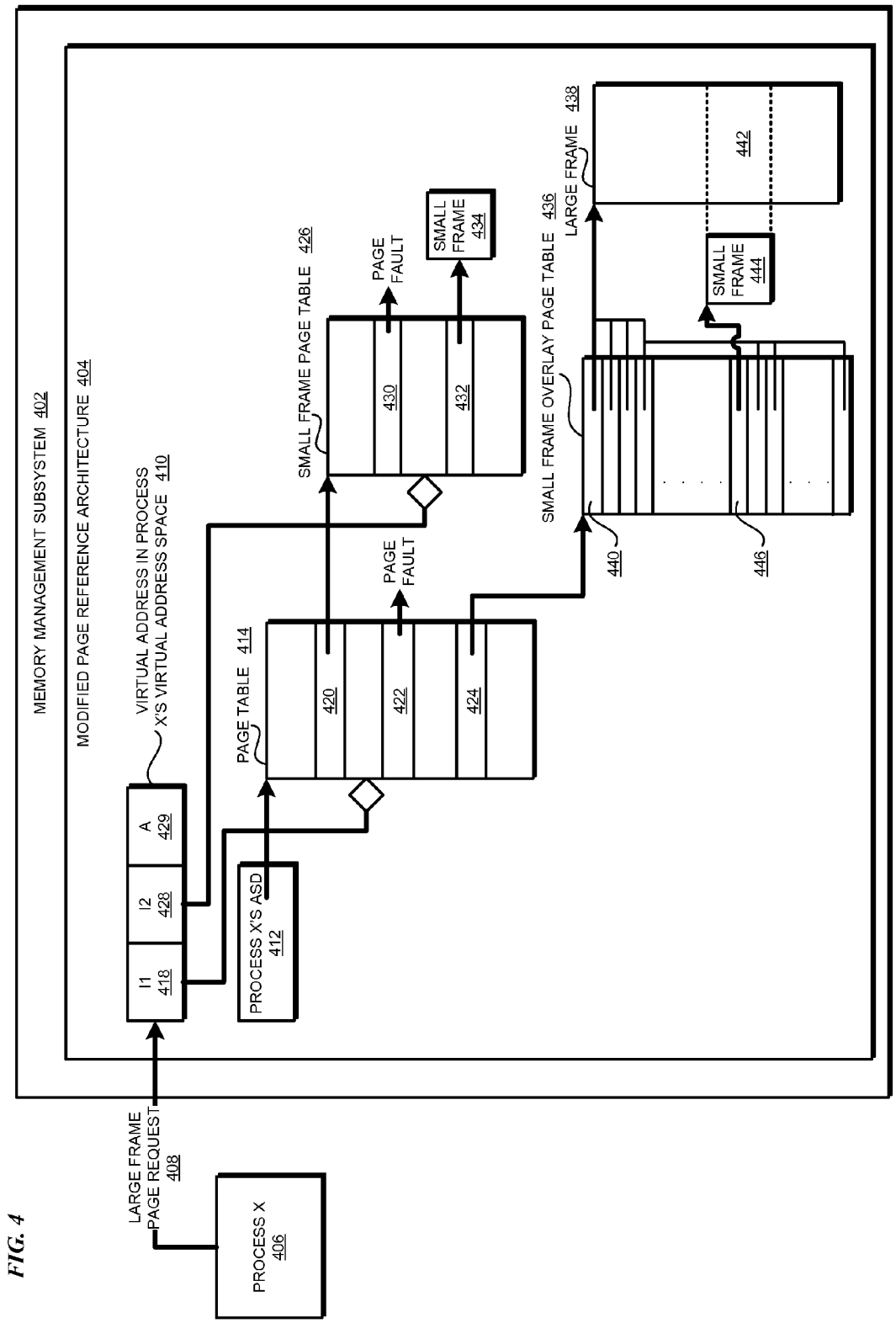
FIG. 4, this figure depicts an example configuration for using large frame pages with variable granularity in accordance with an illustrative embodiment.

With reference to FIG. 4, this figure depicts an example configuration for using large frame pages with variable granularity in accordance with an illustrative embodiment. Memory management subsystem 402 is usually a part of a data processing system such as data processing system 200 in FIG. 2, and managed by an operating system, but can be implemented in any suitable manner. Modified page reference architecture 404 operates in conjunction with memory management subsystem 402.

Process 406, labeled "Process X" sends large frame page request 408 using virtual address 410 from process 406's virtual address space. Request 408 is routed to modified page reference architecture 404, such as by a data processing system via memory management subsystem 402. Modified page reference architecture 404 includes ASD 412 for process 406. ASD 412 identifies page table 414 using which process 406's virtual addresses can be mapped to physical addresses in physical memory. Page table 414 is depicted as a simplified table only for the clarity of the description, and can be implemented in any manner suitable for a given implementation.

Virtual address 410 provides index 418, labeled "I1", which is an index into page cable 414. Modified page reference architecture 404 resolves one part of virtual address 410 using the entry located at index I1 in page table 414.

An entry in page table 414 can resolve in one of three ways, as described with respect to example entries 420, 422, and 424. For example, process 406 may have requested data in a small frame page from memory. Accordingly, entry 420 can point to small frame page table 426. Virtual address 410 provides index 428, labeled "I2", which is an index into small frame page cable 426. Modified page reference architecture 404 resolves another part of virtual address 410 labeled "A" 429, to a physical address in the small frame page identified using the entry located at index I2 in page table 426.

As another example, process 406 may have requested data from an address in a page frame that is not available in memory. Accordingly, entry 422 may cause a page fault, if the requested page exists in secondary storage, or an error, if the requested page does not exist anywhere.

Similarly, reference 420 to small frame page cable 426 and index I2 from virtual address 410 may lead to entry 430, which may lead to a page fault or an error. Reference 420 to small frame page table 426 and index I2 from virtual address 410 may lead to entry 432, which may lead to small frame 434 in memory. If the requested small frame page does exist in memory, or is eventually brought into memory by page fault, such as small frame 434, modified page reference architecture 404 returns to process 406 a mapping in small frame 434, i.e. a physical address in small frame 434 that maps to virtual address 410.

Alternatively, process 406 may have requested data located at an address in a large frame page in memory. According to one embodiment, large frame 438 comprises a set of small frame overlays. Consequently, in one embodiment, entry 424 points to small frame overlay page table 436.

In one embodiment large frame 438 comprises a set of small frames that are all of the same small frame size. In such an embodiment, the location of a particular small frame in large frame 438 can be ascertained by multiplying the index of the small frame in the set of small frames with the size of the small frames to obtain an offset into large frame 438. A virtual address to data within the particular small frame can be mapped to a physical address of the data within the particular small frame component of large frame 438.

For the clarity of the description, and without implying a limitation thereto, assume the embodiment where large frame 438 comprises a set of small-frames of equal size. In one embodiment, small frame overlay page table 436 includes a set of entries where each entry in the set, such as entry 440, corresponds to a small frame that is included in large frame 438. For all small frames included in large frame 438, whose data is the original data of large frame 438, corresponding entries 440 point to the beginning physical address of large frame 438. If virtual address 410 is for some part of the original data of large frame 438, virtual address 410 is mapped to a physical address computed from the beginning physical address of large frame 438.

Suppose that process 406 had changed some data in large frame 438 previously. In one embodiment, modified page reference architecture 404 identifies location 442 where the virtual address range mapped by small frame 444 containing the changed data would reside within the virtual address range of large frame 438. Modified page reference architecture 404 records the change in small frame 444 and updates an entry, such as entry 446, in small frame overlay page table 436 to point to small frame 444. If virtual address 410 is for some part of the changed data of large frame 438, virtual address 410 is mapped to a physical address in small frame 444.

Thus modified page reference architecture 404 creates a view of large frame 438 that is specific to process 406 without creating a (changed) copy of entire large frame 438 for process 406.

For another process, such as "Process Y" (not shown), the changed data of small frame 444 may not be applicable. Accordingly, modified page reference architecture 404 may not find a small frame overlay page table 436 for process Y, or an entry similar to entry 446 in process Y's small frame overlay page table 436. Therefore, modified page reference architecture 404 may map the virtual address in the request from process Y to a physical address of the original contents of large frame 438.

Figure 5:
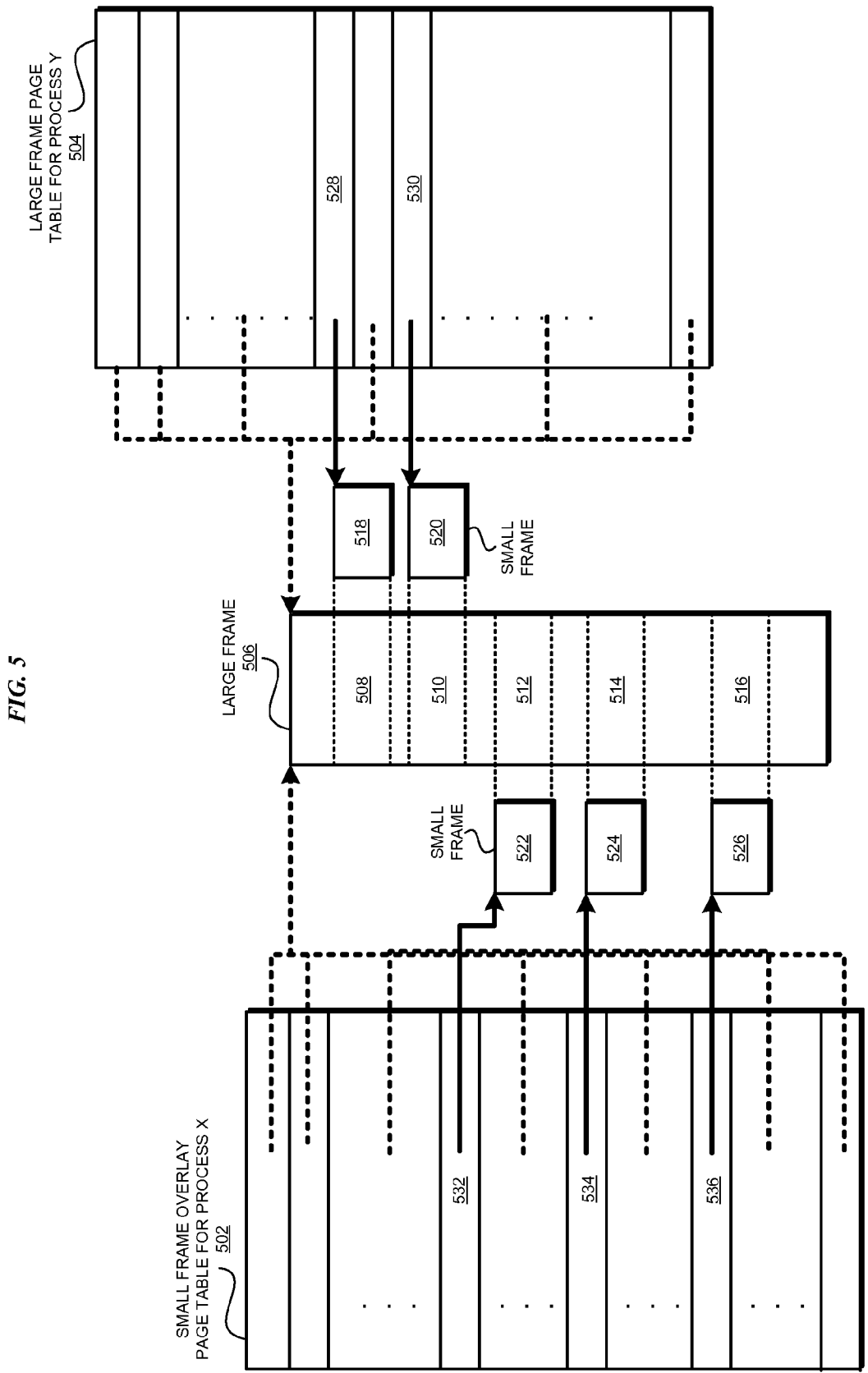
FIG. 5 depicts an example configuration for using large frame with variable granularity in a COW operation in accordance with an illustrative embodiment.

With reference to FIG. 5, this figure depicts an example configuration for using large frame with variable granularity in a COW operation in accordance with an illustrative embodiment. Relative locations of the depicted entries in any particular table are not intended to be indicative of similar relative positioning of the corresponding small frames. Small frame overlay page tables 502 and 504 are similar to small frame overlay page table 436 in FIG. 4. For example, small frame overlay page table 502 maps a set of small frame overlays with changed data onto large frame 506 for process X, and small frame overlay page table 504 maps a different set of small frame overlays with changed data onto large frame 506 for process Y.

Again, only for the clarity of the description, and without implying a limitation thereto, assume the embodiment where large frame 506 comprises a set of small frames of equal size. As described with respect to small frame overlay page table 436 in FIG. 4, for all small frames included in large frame 506, whose data is the original data of large frame 506, corresponding entries in small frame overlay page tables 502 and 504 point to the beginning physical address of large frame 506. If a virtual address, such as virtual address 410 in FIG. 4, is for some part of the original data of large frame 506, the virtual address is mapped to a physical address computed from the beginning physical address of large frame 506.

Assume that process Y has changed chat data in large frame 506 that occupies locations 508 and 510. The remainder of the data of large frame 506, including data in locations 512, 514, and 516, for process Y is the original data of large frame 506. Further assume that process X has changed that data in large frame 506 which occupies locations 512, 514, and 516. The remainder of the data of large frame 506, including data in locations 508 and 510, for process X is the original data of large frame 506.

To create process-specific views of large frame 506, without copying large frame 506 in its entirety and modifying each copy for each of processes X and Y, a modified page reference architecture, such as modified page reference architecture 404 in FIG. 4, creates small frames 518, 520, 522, 524, and 526 containing the changed data for locations 508, 510, 512, 514, and 516, respectively. Using entries 528 and 530, the modified page reference architecture overlays small frames 518 and 520 at locations 508 and 510, respectively, leaving the remainder of the original data of large frame 506 unchanged. The modified page reference architecture then presents a process Y-specific view of large frame 506 to process Y where if a virtual address in a request from process Y is for some part of the changed data of large frame 506, the virtual address is mapped to a physical address in small frame 518 or 520.

Similarly, using entries 532, 534, and 536, the modified page reference architecture overlays small frames 522, 524, and 526 at locations 512, 514, and 516, respectively, leaving the remainder of the original data of large frame 506 unchanged. The modified page reference architecture then presents a process X-specific view of large frame 506 to process X where if a virtual address in a request from process X is for some part of the changed data of large frame 506, the virtual address is mapped to a physical address in small frame 522, 524, or 526.

Figure 6:
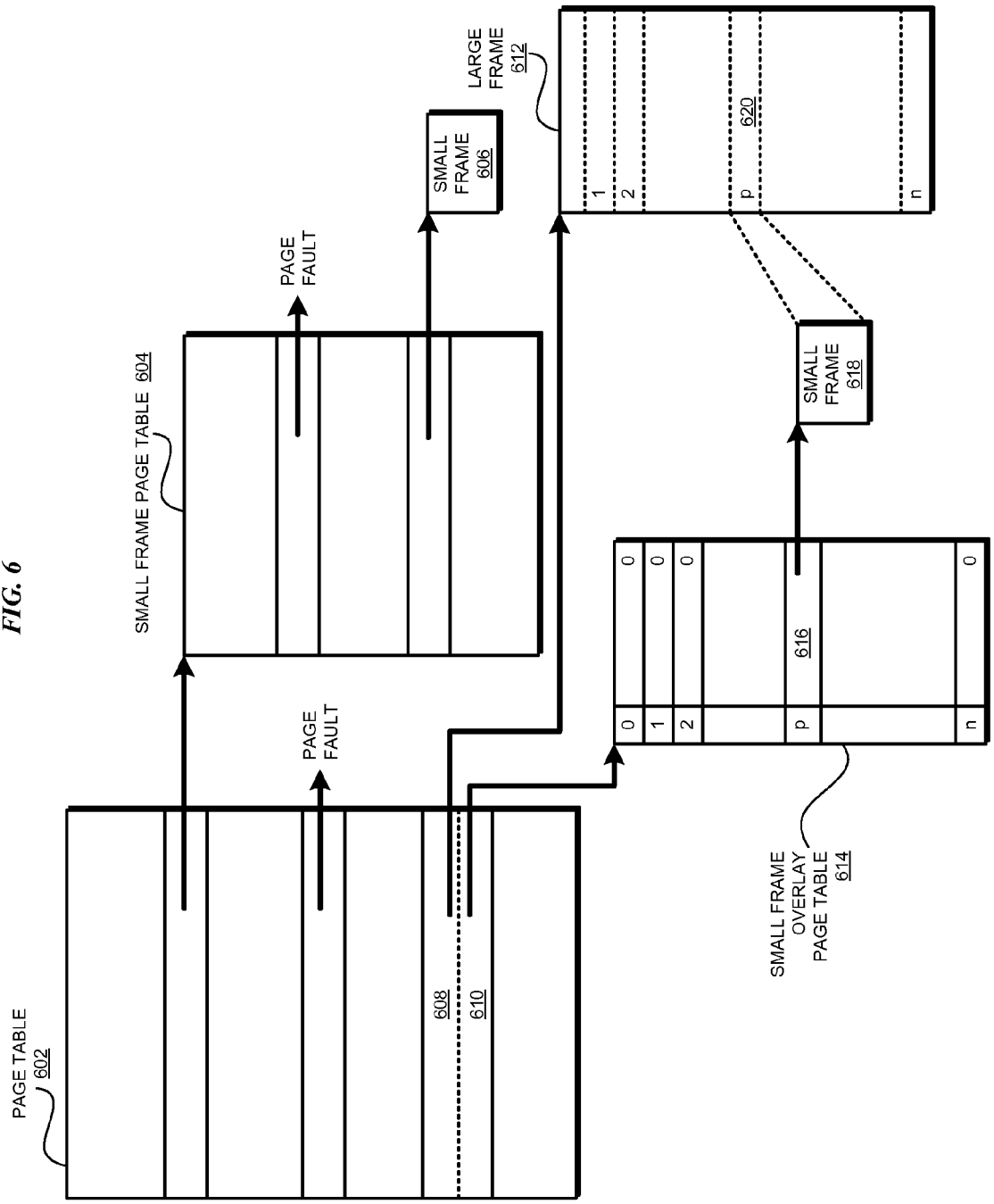
FIG. 6 depicts another example configuration for using large frame pages with variable granularity in accordance with an illustrative embodiment.

With reference to FIG. 6, this figure depicts another example configuration for using large frame pages with variable granularity in accordance with an illustrative embodiment. A modified page reference architecture, such as modified page reference architecture 404 in FIG. 4, can be configured to use this example configuration instead of the configuration shown in FIG. 4.

For the configuration depicted in FIG. 6, page table 602 is usable in place of page table 414 in FIG. 4, and small frame page table 604 is usable in place of small frame page table 426 in FIG. 4. Small frame 606 is analogous to small frame 434 in FIG. 4.

In the configuration of FIG. 4, entry 424 points to small frame overlay page table 436, which leads to large frame 438 and any small frame overlays applicable thereto. In the configuration of FIG. 6, to locate a large frame and any small frame overlays applicable thereto, page table 602 includes either two entries, or a two part entry, or some combination of two pieces of information, depicted as entries 608 and 610. For the clarity of the description, entries 608 and 610 are depicted as two separate entries in page table 602. However, an implementation may implement entries 608 and 610 together as different parts of a single reference, two separate references, a reference value that can be deciphered into two references, or any other suitable form without departing the scope of the illustrative embodiments.

Entry 608 refers to large frame 612 having the original data of large frame 612. Entry 610 refers to small frame overlay page table 614 corresponding to large frame 612 for a specific process. Entry 616 in small frame overlay page table 614 refers to small frame overlay 618, which overlays large frame 612 at location 620. The combination of small frame overlay 618 and large frame 612 creates a process-specific view of large frame 612 and includes the changes made by or for that process. Advantageously, as with the configuration of FIG. 4, this configuration also avoids making copies of entire large frame 612 for the processes that apply different changes to the original data of large frame 612. If a virtual address in a request from the process is for some part of the original data of large frame 612, the virtual address is mapped to a physical address within large frame 612. If a virtual address in a request from the process is for some part of the changed data of large frame 612, the virtual address is mapped to a physical address in small frame 618.

Figure 7:
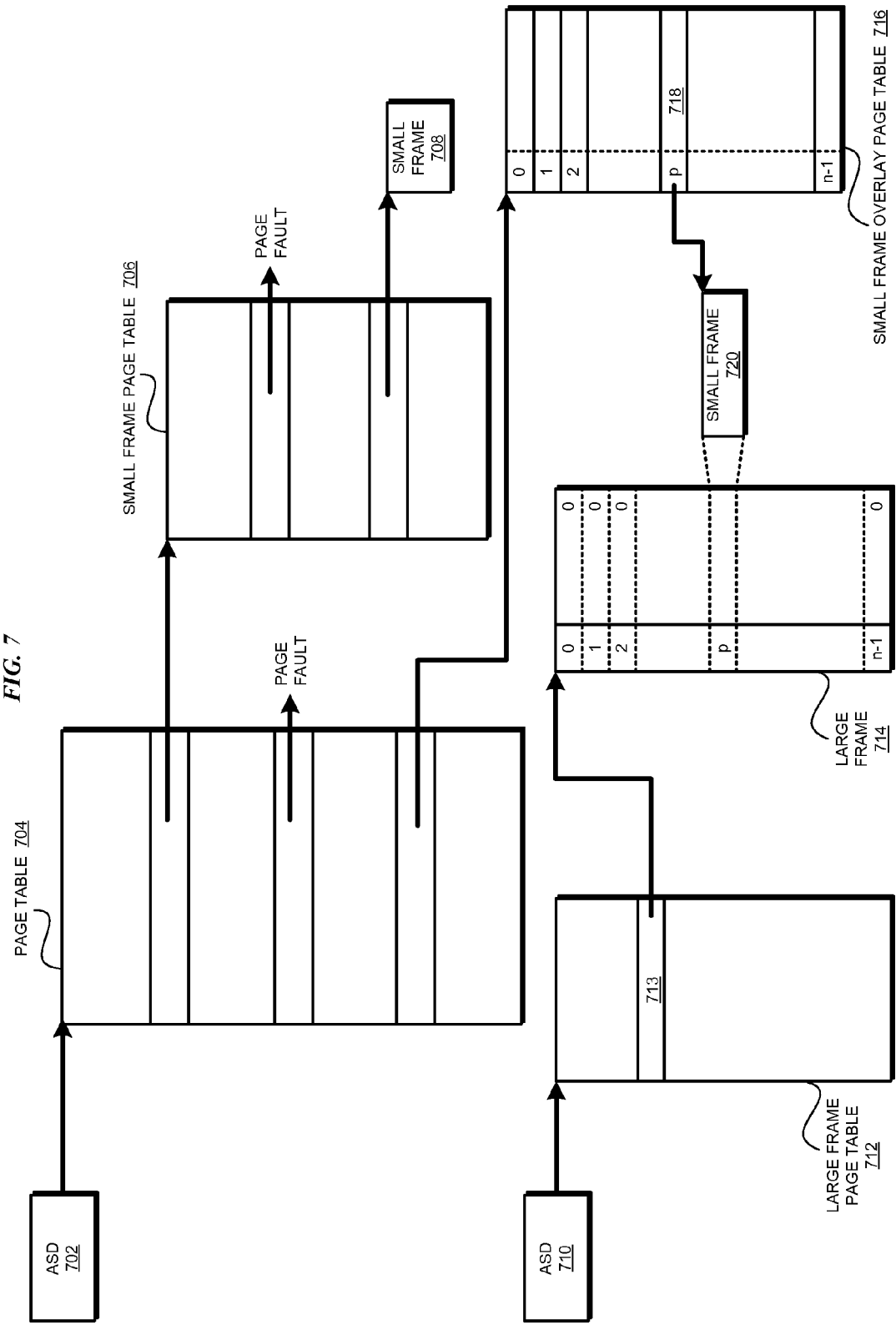
FIG. 7 depicts another example configuration for using large frame pages with variable granularity in accordance with an illustrative embodiment.

With reference to FIG. 7, this figure depicts another example configuration for using large frame pages with variable granularity in accordance with an illustrative embodiment. A modified page reference architecture, such as modified page reference architecture 404 in FIG. 4, can be configured to use this example configuration instead of the configuration shown in FIG. 4.

For the configuration depicted in FIG. 7, two ASDs are used per process. ASD 702 labeled "ASD 1" references the root of page table 704. Page cable 704 references small frame page table 706 in a manner analogous to similar reference in page table 414 in FIG. 4 or 604 in FIG. 6. Small frame 708 is analogous to small frame 434 in FIG. 4 or 606 in FIG. 6. ASD 710 references another page table, namely, large frame page table 712.

Entries in page table 704 only lead to small frames, and the virtual addresses requested by the process are mapped to those small frames. Entries in page table 712 only lead to large frames, such as large frame 714, and the virtual addresses requested by the process are mapped to those large frames and/or any overlaying small frames, such as small frame 720.

Assume, without implying a limitation to such a structure of large frame 714, that large frame 714 maps to n small frames of equal sizes, indexed 0 through (n−1). Assume that the process has modified a part of large frame 714 that corresponds to a small frame component at index "p". When the process requests large frame 714, the modified page reference architecture (not shown), such as modified page reference architecture 404 in FIG. 4 modified to include the configuration of FIG. 7, constructs the process-specific view of large frame 714 as follows—

Using the virtual address in the request from the process, ASD 710 locates large frame 714. For example, a part of the virtual address indexes entry 713, which references large frame 714.

An entry in page table 704 references small frame overlay page table 716 in a manner similar to another entry in page table 704 referencing small frame page table 706. Small frame overlay page cable 716 corresponds to large frame 714 and operates in the manner of small frame overlay page table 614 in FIG. 6 or small frame overlay page cable 436 in FIG. 4. Accordingly, entry 718 at index p in small frame overlay page table 716 refers to small frame overlay 720, which contains the changes made by the process, and maps to the location at index p in large frame 714.

The modified page reference architecture overlays the data of small frame overlay 720 at location index p, with the original data of large frame 714. For example, if a virtual address in a request from the process is for some part of the original data of large frame 714, the virtual address is mapped to a physical address within large frame 714, computed from the root of large frame 714. If a virtual address in a request from the process is for some part of the changed data of large frame 714, the virtual address is mapped to a physical address in small frame 720. Advantageously, as with the configurations of FIGS. 4 and 6, this configuration also avoids making copies of entire large frame 714 for the processes that apply different changes to the original data of large frame 714.

While the operations of FIGS. 4, 5, 6, and 7 are described with respect to small frames of equal sizes, and small frame overlays of that size, such sizes are not intended to be limiting on the illustrative embodiments. Those of ordinary skill in the art will be able to adapt an embodiment of ruse with varying sizes of small frames and small frame overlays, affording variable granularity in the reconstruction of the changed large frames. Such adaptations for variable granularity of large frame changes are contemplated within the scope of the illustrative embodiments.

Figure 8:
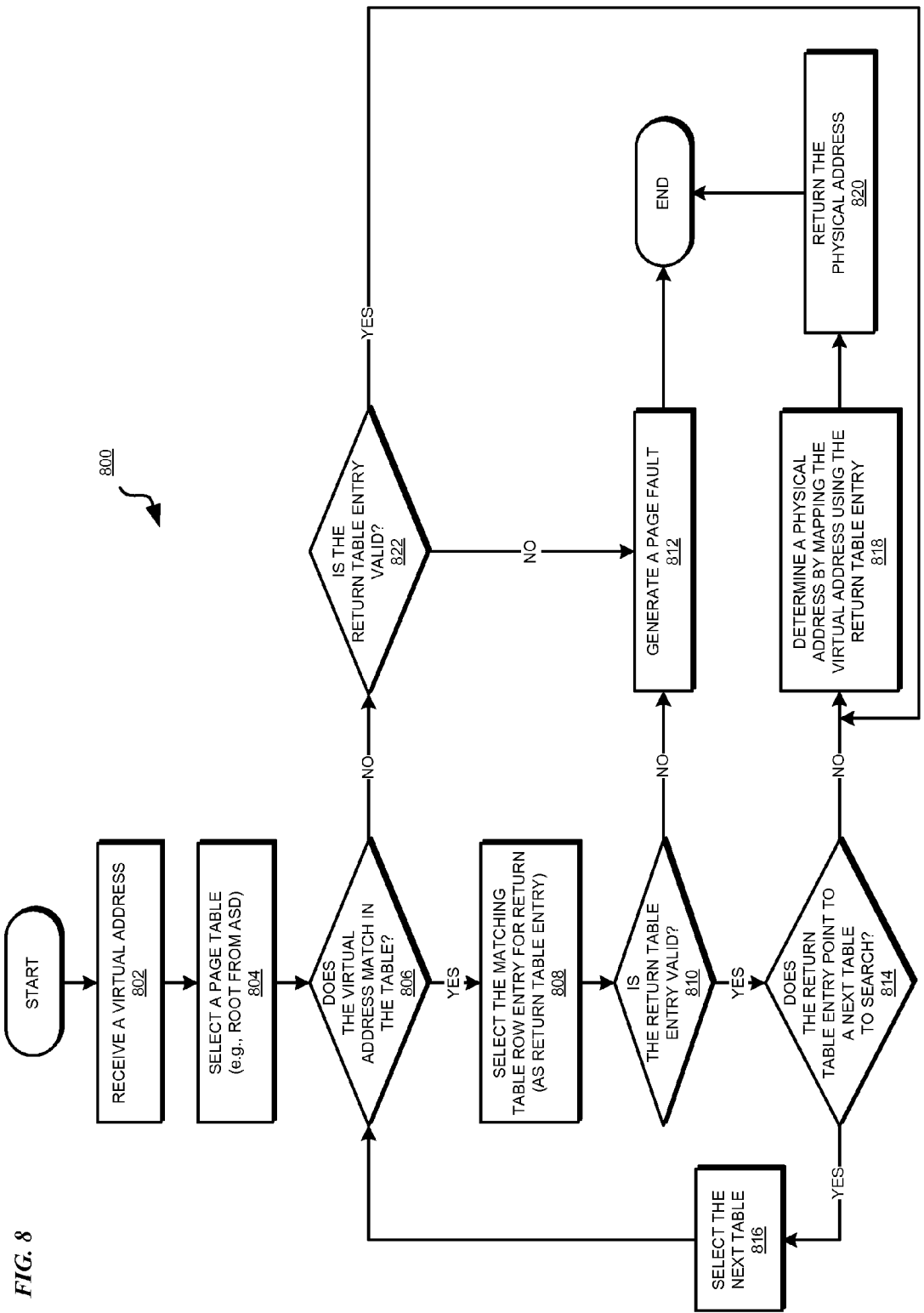
FIG. 8 depicts a flowchart of an example process of using large frames with variable granularity in accordance with an illustrative embodiment.

With reference to FIG. 8, this figure depicts a flowchart of an example process of using large frames with variable granularity in accordance with an illustrative embodiment. Process 800 can be implemented in a modified page reference architecture, such as modified page reference architecture 404 in FIG. 4 adapted for any of the configurations depicted in FIG. 4 or 6.

Process 800 begins by receiving a virtual address (step 802). Process 800 selects a page table to map the virtual address, such as a root table accessible using the address in the ASD register of the process chat sends the virtual address in a request, for example, table 414 in FIG. 4 or table 602 in FIG. 6, (step 804).

Process 800 determines whether all or part of the virtual address matching data in any row of the selected table, such as a page table entry (PTE) in the selected page table (step 806). If a match is found ("Yes" path of step 806), process 800 selects the matching data as a return cable entry (RTE) (step 808).

Process 800 determines whether the RTE is valid, i.e., whether the data in the RTE leads to a page in memory (step 810). If the data in the RTE is not valid ("No" path of step 810), process 812 generates a page fault (step 812). Process 800 ends thereafter.

If the data in the RTE is valid ("Yes" path of step 810), process 800 determines whether the data in the RTE points to a next cable to search (step 814). For example, the data may point to table 436 in FIG. 4 or table 614 in FIG. 6, (step 814). If the data points to a next table ("Yes" path of step 814), process 800 selects the next table (step 816). Process 800 then returns to step 806 and attempts to match all or part of the virtual address in the selected next table.

If the data of the RTE does not point to a next table ("No" path of step 814), process 800 determines a physical address by mapping the virtual address using the RTE data (step 818). Process 800 returns the physical address (step 820). Process 800 ends thereafter.

Returning to step 806, if process 800 determines that the virtual address does not match in the selected cable ("No" path of step 806), process 800 determines whether the RTE contains valid data, i.e., non-NULL data (step 822). If the RTE contains valid data ("Yes" path of step 822), process 800 proceeds to step 818. If the RTE contains invalid data ("No" path of step 822), process 800 proceeds to step 812.

Figure 9:
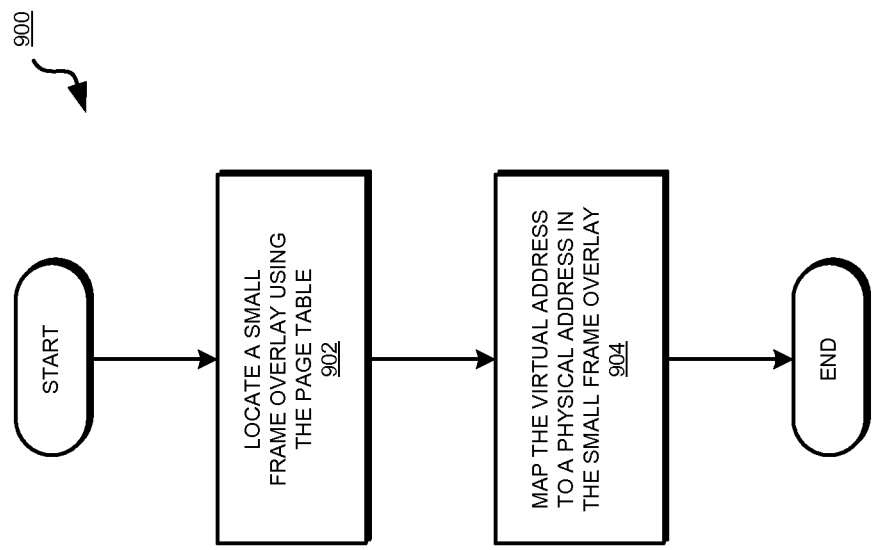
FIG. 9 depicts an example process of overlaying a translation mapping of changed data from a smaller-than-large-frame-size granularity onto a large frame translation mapping in accordance with an illustrative embodiment.

With reference to FIG. 9, this figure depicts an example process of overlaying a translation mapping of changed data from a smaller-than-large-frame-size granularity onto a large frame translation mapping in accordance with an illustrative embodiment. Process 900 can be implemented as step 818 in process 800 of FIG. 8.

Process 900 locates a small frame overlay using a page table, such as the next cable pointed to by the RTE data (step 902). Process 900 maps the virtual address to a physical address in the small frame overlay (step 904). Process 900 ends thereafter.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide a method, system, and computer program product for using large frame pages with variable granularity. An embodiment improves the efficiency of using large frames by reducing the size of frame copy for certain operations to only the size of one or more small frame overlays.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may cake the form of a computer program product embodied in one or more computer readable storage device(s) or computer readable media having computer readable program code embodied thereon.

Any combination of one or more computer readable storage device(s) or computer readable media may be utilized. The computer readable medium may be a computer readable signal medium or a computer readable storage medium. A computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible device or medium that can contain, or store a program for use by or in connection with an instruction execution system, apparatus, or device.

Program code embodied on a computer readable storage device or computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a wide area network (WAN), or a mobile ad hoc network (MANET), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to one or more processors of one or more general purpose computers, special purpose computers, or other programmable data processing apparatuses to produce a machine, such that the instructions, which execute via the one or more processors of the computers or other programmable data processing apparatuses, create means for implementing the functions/acts specified in the flowchart and/or block diagram block or blocks.

These computer program instructions may also be scored in one or more computer readable storage devices or computer readable media that can direct one or more computers, one or more other programmable data processing apparatuses, or one or more other devices to function in a particular manner, such that the instructions stored in the one or more computer readable storage devices or computer readable medium produce an article of manufacture including instructions which implement the function/act specified in the flowchart and/or block diagram block or blocks.

The computer program instructions may also be loaded onto one or more computers, one or more other programmable data processing apparatuses, or one or more other devices to cause a series of operational blocks to be performed on the one or more computers, one or more other programmable data processing apparatuses, or one or more other devices to produce a computer implemented process such that the instructions which execute on the one or more computers, one or more other programmable data processing apparatuses, or one or more other devices provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, a set includes one or more members unless the context indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A computer implemented method for using a large frame, the computer implemented method comprising:
   selecting a page table, wherein the page table references data stored in a physical memory associated with a data processing system;
   determining, using a processor in the data processing system, whether a virtual address in a request corresponds to an entry in the page table;
   determining, responsive to the virtual address corresponding to the entry in the page table, that the entry in the page table identifies a next page table associated with the large frame, wherein the large frame is a page of the data in the memory such that a size of the page exceeds a threshold size;
   determining that the virtual address corresponds to an entry in the next page table, the entry in the next page table referencing a small frame overlay for the large frame, wherein the small frame is a second page of data in the memory such that the size of the second page does not exceed the threshold size;
   mapping the virtual address to a physical address in the small frame overlay using data of the entry in the next page table; and
   returning, responsive to the request, the physical address in a process-specific view of the large frame.

2. The computer implemented method of claim 1, wherein the large frame comprises a set of contiguous virtual addressed small frames, wherein all small frames in the set of small frames are of a common size, and wherein the common size does not exceed the threshold size.

3. The computer implemented method of claim 1, further comprising:
   determining whether a second virtual address in a request corresponds to an entry in a second page table;
   determining that the entry in the second page table identifies a second next page table associated with the large frame;
   determining that the virtual address corresponds to an entry in the second next page table, the entry in the second next page table referencing a second small frame overlay for the large frame;
   mapping the virtual address to a second physical address in the second small frame overlay using data of the entry in the second next page table; and
   returning, responsive to the second request, the second physical address in a second process-specific view of the large frame.

4. The computer implemented method of claim 1, wherein a position of the small frame overlay relative to the large frame is determined using an index of the entry in the next page table.

5. The computer implemented method of claim 1, further comprising:
   receiving a second request including a second virtual address;
   determining that the second virtual address in the second request corresponds to a second entry in the page table;
   determining that the second entry in the page table is valid and identifies a small frame;
   mapping the second virtual address to a second physical address in the small frame using data of the second entry in the page table; and
   returning, responsive to the second request, the second physical address.

6. The computer implemented method of claim 1, further comprising:
   receiving a second request including a second virtual address;
   determining that the second virtual address in the second request corresponds to a second entry in the page table;
   determining that the second entry in the page table is not valid to identify a small frame;

generating a page fault to bring the small frame into the memory.

7. A computer usable program product comprising a non-transitory computer usable storage medium including computer usable code for using a large frame, the computer usable code comprising:
  computer usable code for selecting a page table, wherein the page table references data stored in a physical memory associated with a data processing system;
  computer usable code for determining, using a processor in the data processing system, whether a virtual address in a request corresponds to an entry in the page table;
  computer usable code for determining, responsive to the virtual address corresponding to the entry in the page table, that the entry in the page table identifies a next page table associated with the large frame, wherein the large frame is a page of the data in the memory such that a size of the page exceeds a threshold size;
  computer usable code for determining that the virtual address corresponds to an entry in the next page table, the entry in the next page table referencing a small frame overlay for the large frame, wherein the small frame is a second page of data in the memory such that the size of the second page does not exceed the threshold size;
  computer usable code for mapping the virtual address to a physical address in the small frame overlay using data of the entry in the next page table; and
  computer usable code for returning, responsive to the request, the physical address in a process-specific view of the large frame.

8. The computer usable program product of claim 7, wherein the large frame comprises a set of contiguous virtual addressed small frames, wherein all small frames in the set of small frames are of a common size, and wherein the common size does not exceed the threshold size.

9. The computer usable program product of claim 7, further comprising:
  computer usable code for determining whether a second virtual address in a request corresponds to an entry in a second page table;
  computer usable code for determining that the entry in the second page table identifies a second next page table associated with the large frame;
  computer usable code for determining that the virtual address corresponds to an entry in the second next page table, the entry in the second next page table referencing a second small frame overlay for the large frame;
  computer usable code for mapping the virtual address to a second physical address in the second small frame overlay using data of the entry in the second next page table; and
  computer usable code for returning, responsive to the second request, the second physical address in a second process-specific view of the large frame.

10. The computer usable program product of claim 7, wherein a position of the small frame overlay relative to the large frame is determined using an index of the entry in the next page table.

11. The computer usable program product of claim 7, further comprising:
  computer usable code for receiving a second request including a second virtual address;
  computer usable code for determining that the second virtual address in the second request corresponds to a second entry in the page table;
  computer usable code for determining that the second entry in the page table is valid and identifies a small frame;
  computer usable code for mapping the second virtual address to a second physical address in the small frame using data of the second entry in the page table; and
  computer usable code for returning, responsive to the second request, the second physical address.

12. The computer usable program product of claim 7, further comprising:
  computer usable code for receiving a second request including a second virtual address;
  computer usable code for determining that the second virtual address in the second request corresponds to a second entry in the page table;
  computer usable code for determining that the second entry in the page table is not valid to identify a small frame;
  computer usable code for generating a page fault to bring the small frame into the memory.

13. The computer usable program product of claim 7, wherein the computer usable code is stored in a non-transitory computer readable storage medium in a data processing system, and wherein the computer usable code is transferred over a network from a remote data processing system.

14. The computer usable program product of claim 7, wherein the computer usable code is stored in a non-transitory computer readable storage medium in a server data processing system, and wherein the computer usable code is downloaded over a network to a remote data processing system for use in a non-transitory computer readable storage medium associated with the remote data processing system.

15. A data processing system for using a large frame, the data processing system comprising:
  a storage device, wherein the storage device stores computer usable program code; and
  a processor, wherein the processor executes the computer usable program code, and wherein the computer usable program code comprises:
  computer usable code for selecting a page table, wherein the page table references data stored in a physical memory associated with the data processing system;
  computer usable code for determining, using a processor in the data processing system, whether a virtual address in a request corresponds to an entry in the page table;
  computer usable code for determining, responsive to the virtual address corresponding to the entry in the page table, that the entry in the page table identifies a next page table associated with the large frame, wherein the large frame is a page of the data in the memory such that a size of the page exceeds a threshold size;
  computer usable code for determining that the virtual address corresponds to an entry in the next page table, the entry in the next page table referencing a small frame overlay for the large frame, wherein the small frame is a second page of data in the memory such that the size of the second page does not exceed the threshold size;
  computer usable code for mapping the virtual address to a physical address in the small frame overlay using data of the entry in the next page table; and
  computer usable code for returning, responsive to the request, the physical address in a process-specific view of the large frame.

16. The data processing system of claim 15, wherein the large frame comprises a set of contiguous virtual addressed small frames, wherein all small frames in the set of small frames are of a common size, and wherein the common size does not exceed the threshold size.

17. The data processing system of claim 15, further comprising:

computer usable code for determining whether a second virtual address in a request corresponds to an entry in a second page table;

computer usable code for determining that the entry in the second page table identifies a second next page table associated with the large frame;

computer usable code for determining that the virtual address corresponds to an entry in the second next page table, the entry in the second next page table referencing a second small frame overlay for the large frame;

computer usable code for mapping the virtual address to a second physical address in the second small frame overlay using data of the entry in the second next page table; and computer usable code for returning, responsive to the second request, the second physical address in a second process-specific view of the large frame.

18. The data processing system of claim 15, wherein a position of the small frame overlay relative to the large frame is determined using an index of the entry in the next page table.

19. The data processing system of claim 15, further comprising:

computer usable code for receiving a second request including a second virtual address;

computer usable code for determining that the second virtual address in the second request corresponds to a second entry in the page table;

computer usable code for determining that the second entry in the page table is valid and identifies a small frame;

computer usable code for mapping the second virtual address to a second physical address in the small frame using data of the second entry in the page table; and computer usable code for returning, responsive to the second request, the second physical address.

20. The data processing system of claim 15, further comprising:

computer usable code for receiving a second request including a second virtual address;

computer usable code for determining that the second virtual address in the second request corresponds to a second entry in the page table;

computer usable code for determining that the second entry in the page table is not valid to identify a small frame;

computer usable code for generating a page fault to bring the small frame into the memory.

* * * * *